(12) United States Patent
Park

(10) Patent No.: US 10,421,131 B2
(45) Date of Patent: Sep. 24, 2019

(54) CUTTING TOOL

(71) Applicant: TaeguTec, Ltd., Dalseong-gun, Daegu (KR)

(72) Inventor: Jung Hoon Park, Daegu (KR)

(73) Assignee: TaeguTec, Ltd., Dalseong-gun, Daegu (KR)

( * ) Notice: Subject to any disclaimer, the term of this patent is extended or adjusted under 35 U.S.C. 154(b) by 10 days.

(21) Appl. No.: 15/571,159

(22) PCT Filed: Mar. 23, 2016

(86) PCT No.: PCT/KR2016/002901
§ 371 (c)(1),
(2) Date: Nov. 1, 2017

(87) PCT Pub. No.: WO2016/182188
PCT Pub. Date: Nov. 17, 2016

(65) Prior Publication Data
US 2018/0257151 A1    Sep. 13, 2018

(30) Foreign Application Priority Data
May 8, 2015 (KR) .......................... 10-2015-0064288

(51) Int. Cl.
*B23B 51/02*    (2006.01)

(52) U.S. Cl.
CPC .......... *B23B 51/02* (2013.01); *B23B 2251/04* (2013.01); *B23B 2251/14* (2013.01);
(Continued)

(58) Field of Classification Search
CPC . B23B 51/02; B23B 2251/18; B23B 2251/14; Y10T 408/905; Y10T 408/906; Y10T 408/9065; Y10T 408/9097
See application file for complete search history.

(56) References Cited

U.S. PATENT DOCUMENTS 2,778,252 A    1/1957    Oxford, Jr.
3,564,947 A *  2/1971    Maier .................... B23B 51/02
                                                        408/211
(Continued)

FOREIGN PATENT DOCUMENTS

DE    19602566 A1    7/1997
EP    1475173       11/2004
(Continued)

OTHER PUBLICATIONS

International Search Report dated Nov. 17, 2016, issued in counterpart International (PCT) Application (No. PCT/KR2016/002901).

(Continued)

*Primary Examiner* — Alan Snyder
*Assistant Examiner* — Yasir A Diab
(74) *Attorney, Agent, or Firm* — Womble Bond Dickinson (US) LLP

(57) ABSTRACT

A drill includes a drill body rotatable about a drill axis, and a cutting portion. The cutting portion includes a first grinding face having first and second chisel edges defining an angle therebetween, and a second grinding face having third and fourth chisel edges defining an angle therebetween, the second grinding face being point-symmetrical with the first grinding face. A first relief face associated with a first cutting edge extends from the first and fourth chisel edges and a second relief face associated with a second cutting edge extends from the second and third chisel edges. A first intersection line is formed where the first and second relief faces meet; a second intersection line is formed where the third and fourth relief faces meet. The first and second intersection lines are spaced apart from an imaginary center line passing through the rotational axis and the first and third relief faces.

19 Claims, 6 Drawing Sheets

(52) U.S. Cl.
CPC ....... *B23B 2251/18* (2013.01); *B23B 2251/40* (2013.01); *Y10T 408/9065* (2015.01); *Y10T 408/9097* (2015.01)

(56) References Cited

U.S. PATENT DOCUMENTS

| | | | |
|---|---|---|---|
| 4,116,580 A | 9/1978 | Hall et al. | |
| 4,759,667 A * | 7/1988 | Brown | B23B 51/02 408/227 |
| 4,983,079 A * | 1/1991 | Imanaga | B23B 51/02 408/144 |
| 5,088,863 A | 2/1992 | Imanaga et al. | |
| 5,423,640 A * | 6/1995 | Lindblom | B23B 51/02 408/227 |
| 5,590,987 A * | 1/1997 | Bouzounie | B23B 51/02 408/227 |
| 5,829,927 A | 11/1998 | Nakamura et al. | |
| 5,967,712 A | 10/1999 | Magill et al. | |
| 6,126,367 A * | 10/2000 | Reed | B23B 51/02 408/1 R |
| 8,419,322 B2 | 4/2013 | Hodza et al. | |
| 2005/0100419 A1 | 5/2005 | Stokey et al. | |
| 2005/0249562 A1 | 11/2005 | Frejd | |
| 2007/0227766 A1 | 10/2007 | Ito et al. | |
| 2014/0348605 A1 | 11/2014 | Park | |

FOREIGN PATENT DOCUMENTS

| | | |
|---|---|---|
| EP | 2492034 A1 | 8/2012 |
| JP | S 57-071714 A | 5/1982 |
| JP | H 09-295212 | 11/1997 |
| JP | 10-328918 | 12/1998 |
| JP | 2003-136317 | 5/2003 |
| JP | 2008-296313 A | 12/2008 |
| WO | WO 2012/159881 A2 | 11/2012 |

OTHER PUBLICATIONS

Written Opinion dated Nov. 17, 2016, issued in counterpart International (PCT) Application (No. PCT/KR2016/002901).
Official action dated Aug. 27, 2018, issued in Chinese application (No. 201680025120.4) (no translation).
Extended European Search Report dated Dec. 4, 2018, issued in European application (No. 16792834.0).

* cited by examiner

[Fig. 1]
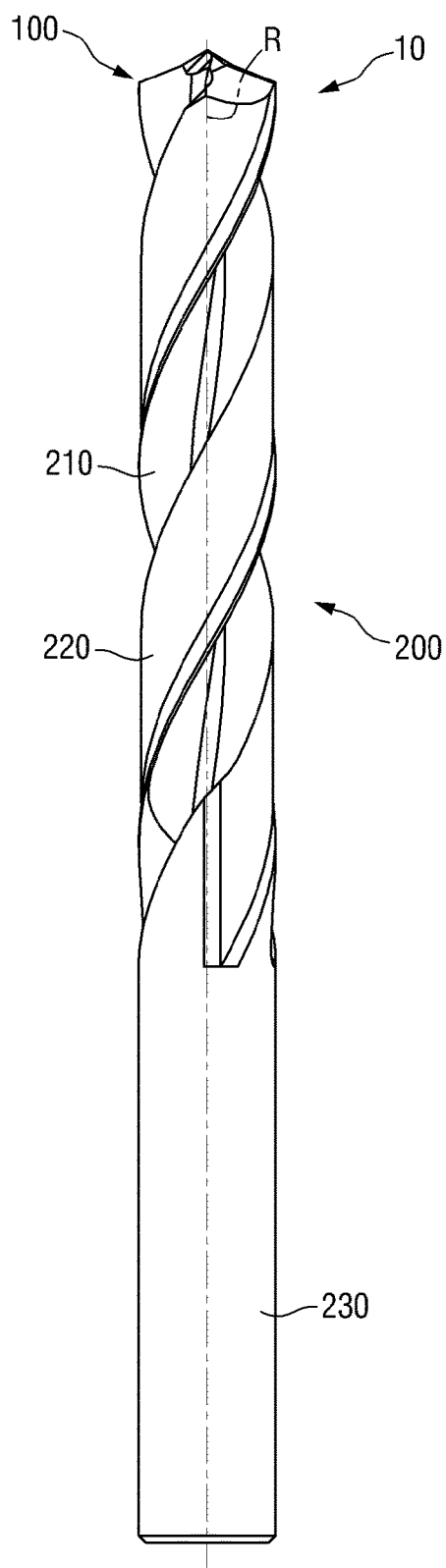

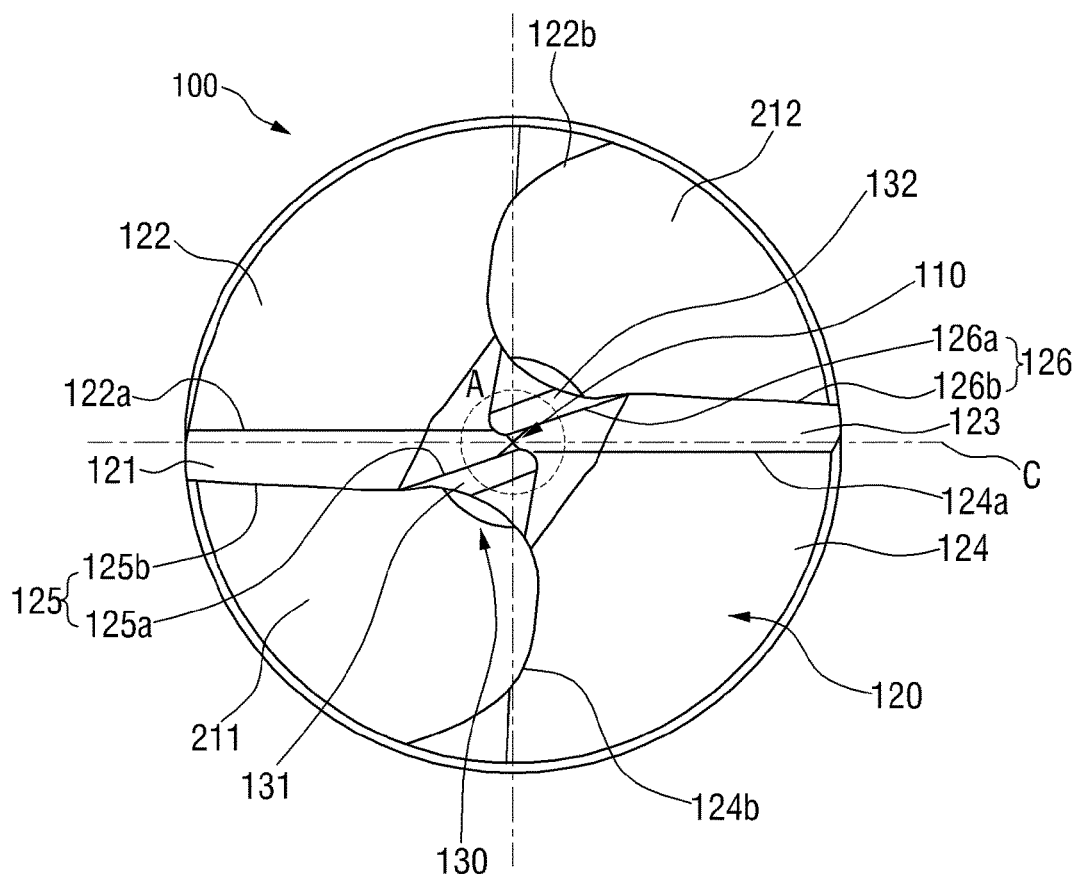
[Fig. 2]

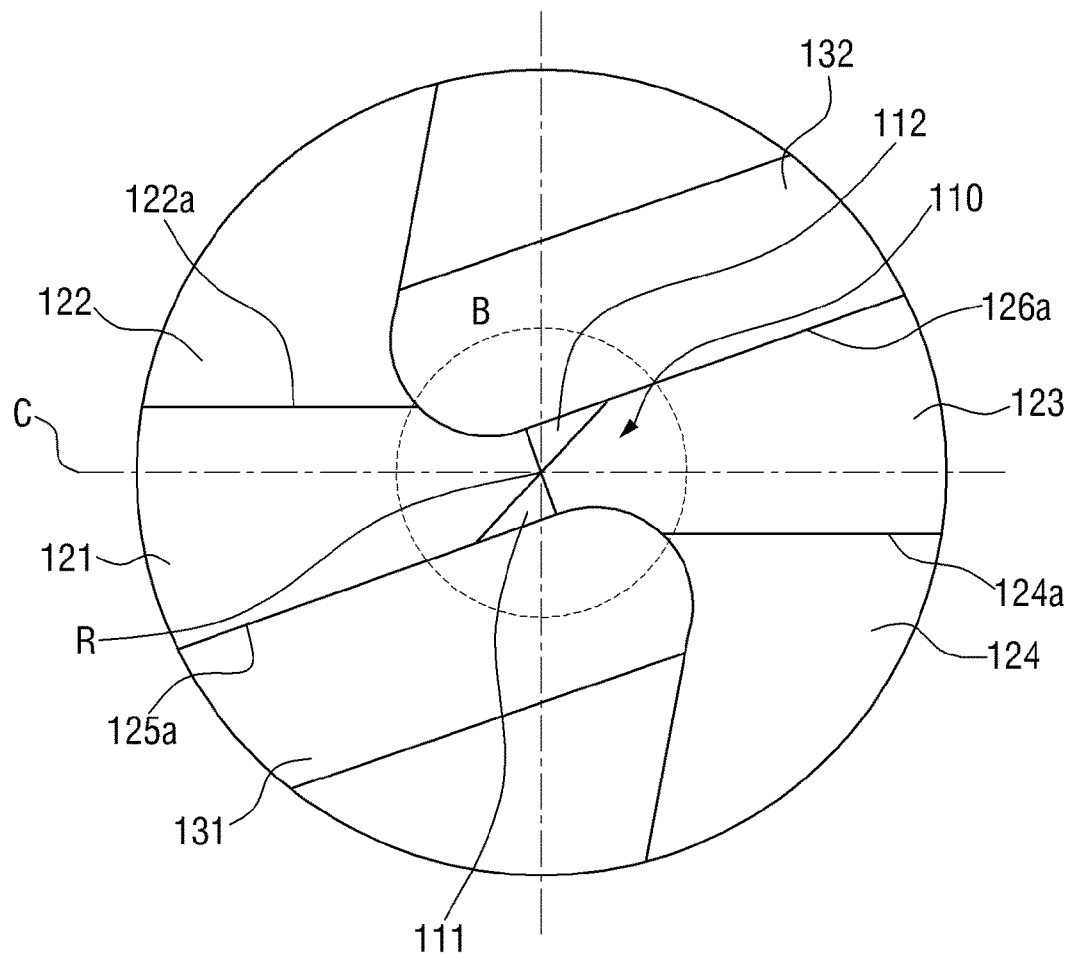
[Fig. 3]

[Fig. 4]
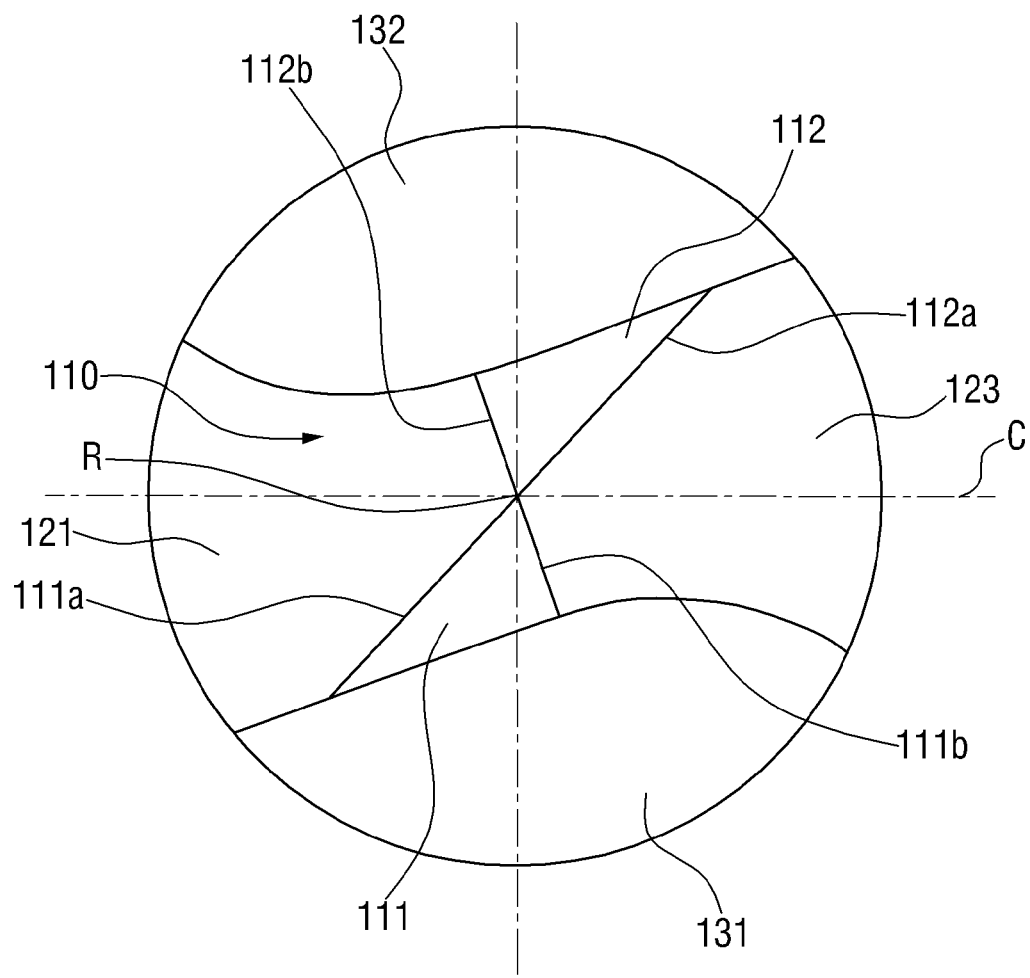

[Fig. 5]
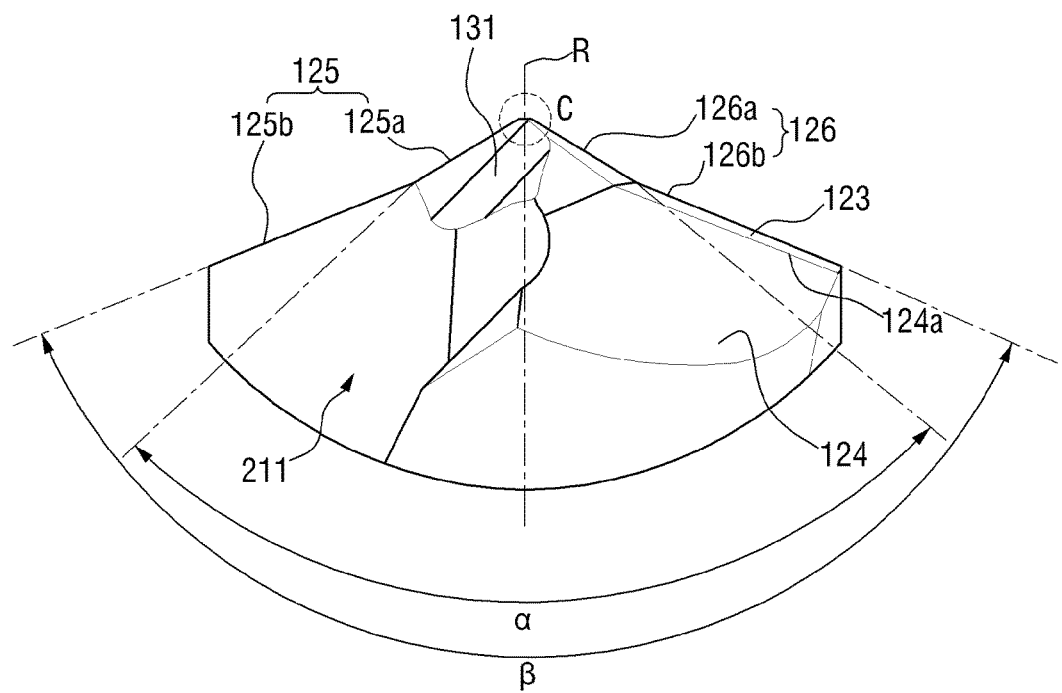
[Fig. 6]
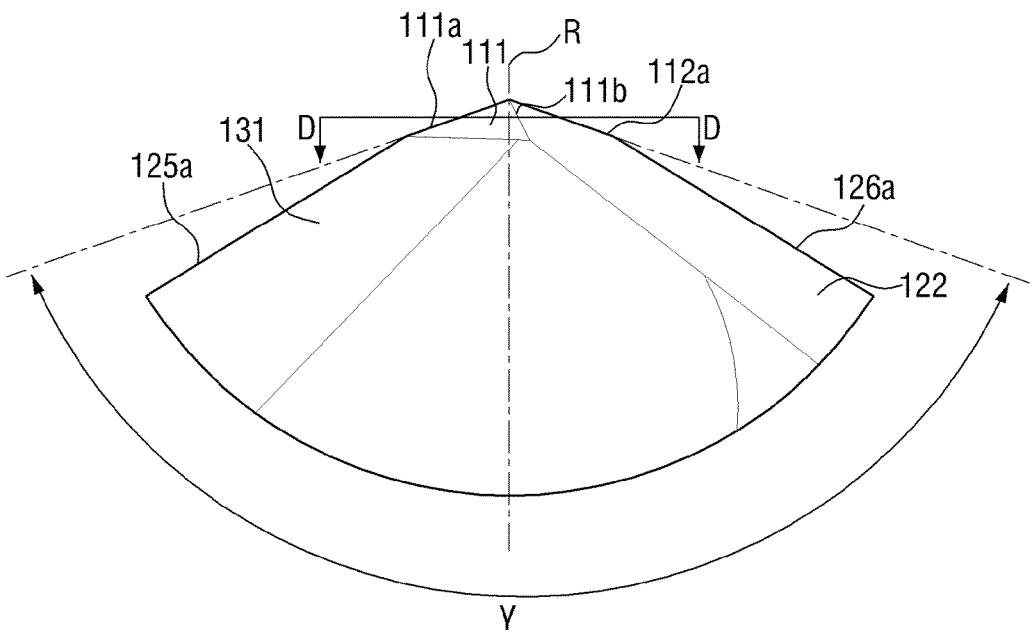

[Fig. 7]
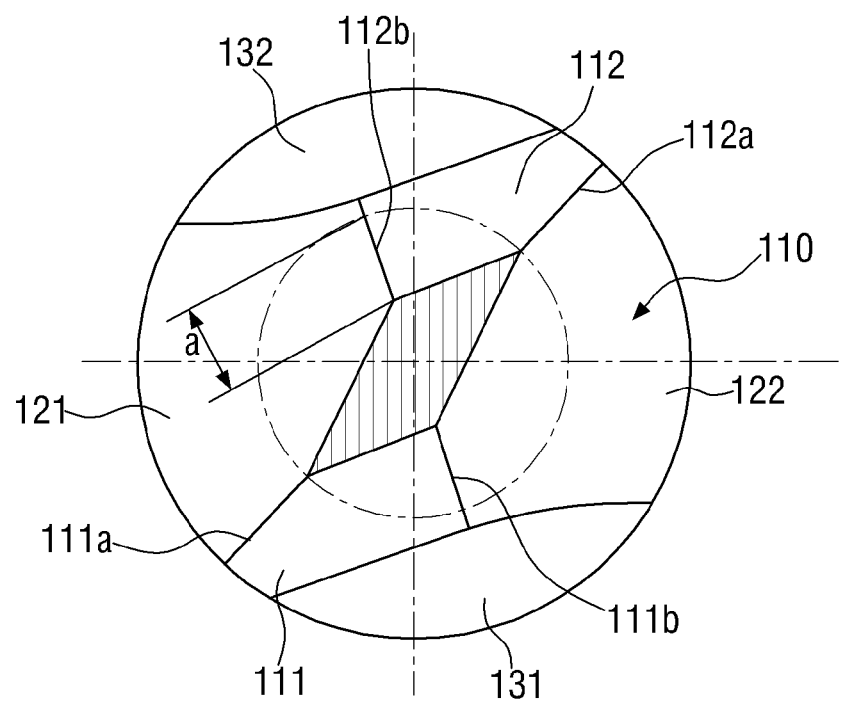

CUTTING TOOL

RELATED APPLICATIONS

This is a 35 USC 371 U.S. National Phase of International Application No. PCT/KR2016/002901 filed 23 Mar. 2016 and published as WO 2016/182188A1 on Nov. 17, 2016, which claims priority to Korean application no. 10-2015-0064288 filed May 8, 2015. The contents of the aforementioned applications are incorporated by reference in their entirety.

TECHNICAL FIELD

The present invention relates to a cutting tool, and more particularly, to a cutting tool having an improved centripetal property and rigidity.

BACKGROUND ART

With the recent demand for precision machining in the field of cutting processes, development of high-performance cutting tools is urgently needed to perform elaborate perforation without additionally performing a subsequent process, such as a finishing operation.

In the cutting process, a centripetal property of a cutting tool can be improved by a high degree of precision in a perforation process, leading to improvement in the precision in view of hole size and shape. The centripetal property of the cutting tool can be improved by reducing a point angle.

However, when the point angle of the cutting tool is reduced, the rigidity of its cutting portion may be undesirably lowered, ultimately resulting in an increased torque of the cutting tool during the cutting process.

In addition, when the cutting tool having a small point angle passes through a to-be-cut material, the size of a burr generated in the perforation process may increase.

PRIOR ART DOCUMENTS

Korean Patent Registration No. 1,406,612 (Jun. 3, 2014)

DISCLOSURE OF INVENTION

Technical Problem

The present invention provides a cutting tool having improved rigidity of its cutting portion while having an improved centripetal property.

The above and other objects of the present invention will be described in or be apparent from the following description of the preferred embodiments.

Solution to Problem

According to an aspect of the present invention, there is provided a cutting tool includes a drill body rotating about an imaginary rotational axis, and a cutting portion located at a leading edge side of the drill body, wherein the cutting portion includes a first grinding face including a first chisel edge radially extending from the rotational axis and a second chisel edge radially extending from the rotational axis and defining a predetermined angle with the first chisel edge, a second grinding face including a third chisel edge disposed to be point-symmetrical to the first chisel edge in terms of the rotational axis and a fourth chisel edge disposed to be point-symmetrical to the second chisel edge in terms of the rotational axis, a first relief face radially extending from the first chisel edge and the fourth chisel edge and including a first cutting edge formed at a front of a rotation direction of the drill body, a second relief face meeting a rear of the rotation direction of the first relief face, a third relief face radially extending from the second chisel edge and the third chisel edge, including a second cutting edge positioned at a front of the rotation direction of the drill body and disposed to be point-symmetrical to the first relief face in terms of the rotational axis, a fourth relief face meeting the rear of the third relief face in the rotation direction, a first intersection line formed along a boundary where the first relief face and the second relief face meet, and a second intersection line formed along a boundary where the third relief face and the fourth relief face meet, wherein the first intersection line and the second intersection line are spaced apart from an imaginary center line passing the rotational axis, the first relief face and the third relief face.

In some embodiments of the present invention, the drill body may include a first chip exhaust groove formed along a rotational axis direction between the first relief face and the fourth relief face, and a second chip exhaust groove formed along the rotational axis direction between the third relief face and the second relief face; the cutting portion may include a first thinning face extending from the first grinding face to the first chip exhaust groove, and a second thinning face extending from the second grinding face to the second chip exhaust groove; the first cutting edge may include a first thinning cutting edge formed between the first thinning face and the first relief face, and a first chip cutting edge formed between the first chip exhaust groove and the first relief face; the second cutting edge may include a second thinning cutting edge formed between the second thinning face and the third relief face, and a second chip cutting edge formed between the second chip exhaust groove and the third relief face; and a first point angle defined by the first thinning cutting edge and the second thinning cutting edge may be smaller than a second point angle defined by the first chip cutting edge and the second chip cutting edge.

In some embodiments of the present invention, the first point angle may be in a range of between 90 degrees and 130 degrees.

In some embodiments of the present invention, a third point angle defined by the first grinding face and the second grinding face may be larger than the first point angle.

In some embodiments of the present invention, the third point angle may be in a range of between 120 degrees and 160 degrees.

In some embodiments of the present invention, the first chisel edge and the third chisel edge may be inclined rearward of the drill body at a first angle with respect to the rotational axis, and the second chisel edge and the fourth chisel edge may be inclined rearward of the drill body at a second angle smaller than the first angle with respect to the rotational axis.

In some embodiments of the present invention, the first intersection line and the second intersection line may be formed to be parallel with the center line.

Advantageous Effects of Invention

The cutting tool according to the present invention has one or more of the following effects.

That is to say, the cutting tool according to the present invention can improve its centripetal property and rigidity of its cutting portion.

BRIEF DESCRIPTION OF DRAWINGS

The above and other features and advantages of the present invention will become more apparent by describing in detail preferred embodiments thereof with reference to the attached drawings in which:

FIG. 1 is a side view of a cutting tool according to an embodiment of the present invention;

FIG. 2 is a plan view illustrating a portion of the cutting tool shown in FIG. 1;

FIG. 3 is an enlarged view of a portion A of FIG. 2;

FIG. 4 is an enlarged view of a portion B of FIG. 3;

FIG. 5 is a side view illustrating a portion of the cutting tool shown in FIG. 1;

FIG. 6 is an enlarged view of a portion C of FIG. 5; and

FIG. 7 is a cross-sectional view taken along the line D-D of FIG. 6.

MODE FOR THE INVENTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In the drawings, the size and relative sizes of layers and regions may be exaggerated for clarity.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a cutting tool according to an embodiment of the present invention will be described with reference to the accompanying drawings.

FIG. 1 is a side view of a cutting tool according to an embodiment of the present invention.

Referring to FIG. 1, the cutting tool 10 according to an embodiment of the present invention includes a drill body 200 and a cutting portion 100.

The drill body 200 rotates about an imaginary rotational axis (R) by rotating power. The drill body 200 has a substantially cylindrical shape with respect to the rotational axis R. In addition, the drill body 200 includes ribs 220, chip exhaust grooves 210 and a shank 230.

The drill body 200 has the cutting portion 100 positioned in its front end and the substantially cylindrical shank 230 positioned in its rear. In addition, the drill body 200 includes the ribs 220 and the chip exhaust grooves 210.

The ribs 220 and the chip exhaust grooves 210 may be spirally formed along the rotational axis R of the drill body 200, but not limited thereto. Rather, the ribs 220 and the chip exhaust grooves 210 may be linearly formed. Here, the chip exhaust grooves 210 may serve as an exhaust path between the ribs 220 to exhaust the chips produced in the cutting process.

In an embodiment of the present invention, the ribs 220 and the chip exhaust grooves 210 are provided in pair. The chip exhaust grooves 210 are disposed to be point-symmetrical to each other in terms of the rotational axis R. In addition, the ribs 220 and the chip exhaust grooves 210 extend toward the rear of the drill body 200 while being twisted at a predetermined twist angle around the rotational axis R.

The shank 230 is positioned in the rear of the drill body 200 and is coupled to a machining tool. Accordingly, the shank 230 functions to transfer power of the machining tool to the cutting tool 10.

The cutting portion 100 is a portion directly used in a perforation process and is positioned at the front of the drill body 200. In an embodiment of the present invention, the cutting portion 100 is integrally formed with the front end of the drill body 200, but not limited thereto. The cutting portion 100 may be detachably coupled to a mounting portion (not shown) formed at the front of the drill body 200 by, for example, screw engagement. The cutting portion 100 will later be described in detail.

FIG. 2 is a plan view illustrating a portion of the cutting tool shown in FIG. 1, FIG. 3 is an enlarged view of a portion A of FIG. 2, and FIG. 4 is an enlarged view of a portion B of FIG. 3.

Referring to FIGS. 2 to 4, the cutting portion 100 includes a chisel portion 110, a relief portion 120 and a thinning portion 130.

The chisel portion 110 corresponds to a portion which includes the rotational axis R and a region around the rotational axis R, and a feeding position of the to-be-cut material is guided by the chisel portion 110. In addition, the chisel portion 110 includes a first grinding face 111 and a second grinding face 112.

As illustrated in FIG. 4, the first grinding face 111 and the second grinding face 112 are formed to be inclined rearward of the drill body 200 while radially extending from the rotational axis R. Accordingly, the first grinding face 111 and the second grinding face 112 may increase a centripetal property of a drill, compared to a case where two grinding faces are not formed in the chisel portion 110, as confirmed through experimentation.

The first grinding face 111 is a face on which the to-be-cut material is grinded and includes a first chisel edge 111a and a second chisel edge 111b formed at corners of the first grinding face 111.

The first chisel edge 111a extends radially outward from the rotational axis R. In addition, the first chisel edge 111a is formed to be inclined rearward of the drill body 200 while extending radially outward from the rotational axis R.

The second chisel edge 111b extends radially outward from the rotational axis R. In addition, the second chisel edge 111b is formed to be inclined rearward of the drill body 200 while extending radially outward from the rotational axis R.

The second chisel edge 111b defines a predetermined angle with the first chisel edge 111a in terms of the rotational axis R. The second chisel edge 111b defines an angle in a range greater than 0 degree and less than 180 degrees with the first chisel edge 111a in terms of the rotational axis R.

For example, in an embodiment of the present invention, the second chisel edge 111b defines an acute angle with the first chisel edge 111a in terms of the rotational axis R, but aspects of the present invention are not limited thereto. Alternatively, the second chisel edge 111b may define a right angle or an obtuse angle with the first chisel edge 111a in terms of the rotational axis R.

The second grinding face 112 is disposed to be substantially point-symmetrical to the first grinding face 111 in terms of the rotational axis R. In addition, the second grinding face 112 is a face on which the to-be-cut material is grinded in cooperation with the first grinding face 111 and includes a third chisel edge 112a and a fourth chisel edge 112b formed at corners of the second grinding face 112.

The third chisel edge 112a extends radially outward from the rotational axis R. In addition, the third chisel edge 112a is formed to be inclined rearward of the drill body 200 while extending radially outward from the rotational axis R.

In addition, the third chisel edge 112a is disposed to be substantially point-symmetrical to the first chisel edge 111a in terms of the rotational axis R. Accordingly, the third chisel edge 112a extends in a direction opposite to the extending direction of the first chisel edge 111a.

The fourth chisel edge 112b extends radially outward from the rotational axis R. In addition, the fourth chisel edge 112b is formed to be inclined rearward of the drill body 200 while extending radially outward from the rotational axis R. In addition, the fourth chisel edge 112b is disposed to be substantially point-symmetrical to the second chisel edge 111b in terms of the rotational axis R. Accordingly, the fourth chisel edge 112b extends in a direction opposite to the extending direction of the second chisel edge 111b.

The relief portion 120 extends radially outward from the rotational axis R. The relief portion 120 includes a first relief face 121, a second relief face 122, a third relief face 123 and a fourth relief face 124, which will later be described in detail.

The thinning portion 130 extends from the chisel portion 110 to the chip exhaust groove 210. The thinning portion 130 serves to reduce a propulsive force in the cutting resistance during the perforation process. In addition, the thinning portion 130 includes a first thinning face 131 and a second thinning face 132, which will later be described.

As described above, the drill body 200 includes at least two chip exhaust grooves 211 and 212. In addition, as illustrated in FIG. 2, the chip exhaust groove 210 includes a first chip exhaust groove 211 and a second chip exhaust groove 212.

The first chip exhaust groove 211 is spirally formed along the rotational axis R between the first relief face 121 and the fourth relief face 124. The fourth relief face 124 is disposed at the front of the rotation direction of the first chip exhaust groove 211, and the first relief face 121 is disposed at the rear of the rotation direction of the first chip exhaust groove 211.

The second chip exhaust groove 212 is spirally formed along the direction of the rotational axis R between the third relief face 123 and the second relief face 122. The second relief face 122 is disposed at the front of the rotation direction of the second chip exhaust groove 212, and the third relief face 123 is disposed at the rear of the rotation direction of the second chip exhaust groove 212.

As described above, the relief portion 120 includes the first relief face 121, the second relief face 122, the third relief face 123 and the fourth relief face 124.

The first relief face 121 extends radially outward from the first chisel edge 111a and the fourth chisel edge 112b. The first relief face 121 is formed to be inclined rearward of the drill body 200 while extending radially outward.

Accordingly, the first chisel edge 111a is formed between the first relief face 121 and the first grinding face 111, and the fourth chisel edge 112b is formed between the first relief face 121 and the second grinding face 112.

The first relief face 121 is configured such that the first chip exhaust groove 211 is positioned at the front of the rotation direction of the drill body 200. In addition, a first cutting edge 125 is formed between the first relief face 121 and the first chip exhaust groove 211. In other words, the first relief face 121 has the first cutting edge 125 formed in the rotation direction of the drill body 200. The first cutting edge 125 will later be described in detail. In addition, the first relief face 121 meets the second relief face 122 at the rear of the rotation direction of the drill body 200.

The second relief face 122 meets the rear of the rotation direction of the first relief face 121. Accordingly, a first intersection line 122a is formed at a boundary where the first relief face 121 and the second relief face 122 meet. In other words, the first intersection line 122a is formed along the boundary between the first relief face 121 and the second relief face 122. In addition, the second relief face 122 is configured such that the second chip exhaust groove 212 is positioned at the rear of the rotation direction of the drill body 200. The second relief face 122 has an arc shaped curve 122b at its intersection with respect to the second chip exhaust groove 212.

The third relief face 123 extends radially outward from the second chisel edge 111b and the third chisel edge 112a. The third relief face 123 is formed to be inclined rearward of the drill body 200 while extending radially outward from the rotational axis R.

Accordingly, the second chisel edge 111b is formed between the third relief face 123 and the first grinding face 111, and the third chisel edge 112a is formed between the third relief face 123 and the second grinding face 112.

The third relief face 123 is configured such that the second chip exhaust groove 212 is positioned at the front of the rotation direction of the drill body 200. In addition, a second cutting edge 126 is formed between the third relief face 123 and the second chip exhaust groove 212. In other words, the third relief face 123 has the second cutting edge 126 formed at the front of the rotation direction of the drill body 200. The second cutting edge 126 will later be described in detail. In addition, the third relief face 123 meets the fourth relief face 124 at the rear of the rotation direction of the drill body 200.

The fourth relief face 124 meets the rear of the rotation direction of the third relief face 123. Accordingly, a second intersection line 124a is formed at a boundary where the third relief face 123 and the fourth relief face 124 meet. In other words, the second intersection line 124a is formed along the boundary between the third relief face 123 and the fourth relief face 124. The fourth relief face 124 is configured such that the first chip exhaust groove 211 is positioned in the rear of the rotation. An intersection line of the fourth relief face 124 and the second chip exhaust groove 212 is shaped of a curved arc 124b.

The first intersection line 122a and the second intersection line 124a are spaced apart from an imaginary center line C passing the rotational axis R, the first relief face 121 and the third relief face 123. Accordingly, the rigidity of the chisel portion 110 may be improved, compared to a case where the first intersection line 122a and the second intersection line 124a are disposed on the imaginary center line C, which can be confirmed through experimentation.

The thinning portion 130 extends from the chisel portion 110 to the chip exhaust groove 210. The thinning portion 130 serves to reduce a propulsive force of cutting resistance during the perforation process. In addition, the thinning portion 130 includes the first thinning face 131 and the second thinning face 132.

The first thinning face 131 extends from the first grinding face 111 to the first chip exhaust groove 211. The first thinning face 131 is formed to be inclined rearward of the drill body 200 while extending toward the first chip exhaust groove. In addition, the first thinning face 131 meets a portion of the first relief face 121 at a front of the rotation direction.

The second thinning face 132 extends from the second grinding face 112 to the second chip exhaust groove 212. The second thinning face 132 is formed to be inclined rearward of the drill body 200 while extending toward the second chip exhaust groove 212. In addition, the second thinning face 132 meets a portion of the third relief face 123 at a front of the rotation direction.

As described above, the first cutting edge 125 is formed at the front of the rotation direction of the first relief face 121. The first cutting edge 125 cuts the to-be-cut material in cooperation with the second cutting edge 126.

The first cutting edge 125 includes a first thinning cutting edge 125a formed between the first thinning face 131 and the first relief face 121 and a first chip cutting edge 125b formed between the first chip exhaust groove 211 and the first relief face 121.

As illustrated in FIG. 2, the first thinning cutting edge 125a is positioned to be closer to the rotational axis R than the first chip cutting edge 125b. In addition, the first chip cutting edge 125b extends radially outward from the first thinning cutting edge 125a.

The second cutting edge 126 is formed at the front of a rotation direction of the third relief face 123. In addition, the second cutting edge 126 includes a second thinning cutting edge 126a formed between the second thinning face 132 and the third relief face 123 and a second chip cutting edge 126b formed between the second chip exhaust groove 212 and the third relief face 123.

As illustrated in FIG. 2, the second thinning cutting edge 126a is positioned to be closer to the rotational axis R than the second chip cutting edge 126b. In addition, the second chip cutting edge 126b extends radially outward from the second thinning cutting edge 126a.

FIG. 5 is a side view illustrating a portion of the cutting tool shown in FIG. 1 and FIG. 6 is an enlarged view of a portion C of FIG. 5.

Referring to FIGS. 5 and 6, a point angle of the cutting portion 100 according to an embodiment of the present invention is a three-stage angle.

As described above, the first relief face 121 and the third relief face 123 are formed to be inclined rearward of the drill body 200 while extending radially outward from the rotational axis R. In other words, the first relief face 121 and the third relief face 123 are inclined rearward of the drill body 200 with respect to an imaginary plane perpendicular to the rotational axis R.

As illustrated in FIG. 5, the first cutting edge 125 of the first relief face 121 and the second cutting edge 126 of the third relief face 123 are also inclined rearward of the drill body 200 with respect to an imaginary plane perpendicular to the rotational axis R. Accordingly, the first cutting edge 125 and the second cutting edge 126 define a predetermined point angle. In addition, the point angle defined by the first cutting edge 125 and the second cutting edge 126 is a two-stage angle, which will later be described in detail.

As described above, the first cutting edge 125 includes the first thinning cutting edge 125a and the first chip cutting edge 125b. The second cutting edge 126 includes the second thinning cutting edge 126a and the second chip cutting edge 126b.

The first thinning cutting edge 125a and the second thinning cutting edge 126a are point-symmetrical to each other in terms of the rotational axis R. In addition, the first thinning cutting edge 125a and the second thinning cutting edge 126a define a first point angle ($\alpha$). Here, the first point angle ($\alpha$) may be in a range of between approximately 90 degrees and approximately 130 degrees.

The first chip cutting edge 125b and the second chip cutting edge 126b are point-symmetrical to each other in terms of the rotational axis R. In addition, the first chip cutting edge 125b and the second chip cutting edge 126b define a second point angle ($\beta$).

As illustrated in FIG. 5, an interior portion of the first relief face 121 meeting the first thinning face 131 is more inclined rearward of the drill body 200 than an exterior portion of the first relief face 121 meeting the first chip exhaust groove 211. For example, the interior portion of the first relief face 121 meeting the first thinning face 131 is inclined rearward of the drill body 200 at an angle A with respect to the imaginary plane perpendicular to the rotational axis R.

In addition, the exterior portion of the first relief face 121 meeting the first chip exhaust groove 211 is inclined rearward of the drill body 200 at an angle B smaller than the angle A with respect to the imaginary plane perpendicular to the rotational axis R.

As illustrated in FIG. 5, an interior portion of the third relief face 123 meeting the second thinning face 132 is more inclined rearward of the drill body 200 than an exterior portion of the third relief face 123 meeting the second chip exhaust groove 212. For example, the interior portion of the third relief face 123 meeting the second thinning face 132 is inclined rearward of the drill body 200 at the angle A with respect to the imaginary plane perpendicular. In addition, the exterior portion of the third relief face 123 meeting the second chip exhaust groove 212 is inclined rearward of the drill body 200 at the angle B smaller than the angle A with respect to the imaginary plane.

Accordingly, the first point angle defined by the first thinning cutting edge 125a and the second thinning cutting edge 126a is smaller than the second point angle ($\beta$) defined by the first chip cutting edge 125b and the second chip cutting edge 126b. For example, the second point angle ($\beta$) is approximately 140 degrees and the first point angle ($\alpha$) is approximately 110 degrees. Accordingly, the centripetal property of the cutting tool (10 of FIG. 1) can be improved, as confirmed through experimentation.

As illustrated in FIG. 6, the first grinding face 111 and the second grinding face 112 are inclined rearward of the drill body 200 while extending radially outward from the rotational axis R. In other words, the first grinding face 111 and the second grinding face 112 are inclined rearward of the drill body 200 with respect to the imaginary plane perpendicular to the rotational axis R.

Accordingly, the first grinding face 111 and the second grinding face 112 define a third point angle ($\gamma$). The third point angle (γ) defined by the first grinding face 111 and the second grinding face 112 may be larger than the first point angle (α). In addition, the third point angle (γ) may be in a range of between 120 degrees and 160 degrees. For example, when the first point angle (α) is approximately 140 degrees and the second point angle (β) is approximately 110 degrees, the third point angle (γ) may be approximately 150 degrees.

FIG. 7 is a cross-sectional view taken along the line D-D of FIG. 6.

As illustrated in FIGS. 6 and 7, the first grinding face 111 according to an embodiment of the present invention includes a first chisel edge 111a and a second chisel edge 111b. In addition, the second grinding face 112 includes a third chisel edge 112a and a fourth chisel edge 112b.

As described above, the first chisel edge 111a and the third chisel edge 112a are point-symmetrical to each other in terms of the rotational axis R. In addition, the second chisel edge 111b and the fourth chisel edge 112b are point-symmetrical to each other in terms of the rotational axis R.

As illustrated in FIGS. 6 and 7, the first chisel edge 111a and the third chisel edge 112a are inclined rearward of the drill body 200 at a first angle with respect to the rotational axis R. The second chisel edge 111b and the fourth chisel edge 112b are inclined rearward of the drill body 200 at a second angle with respect to the rotational axis R. In addition, the first angle and the second angle are different from each other. In an embodiment of the present invention, the second angle is smaller than the first angle.

As the second angle becomes smaller than the first angle, chisel edges adjacent to each other define various phase differences (a) on a sectional surface perpendicular to the rotational axis R. In other words, adjacent corners among corners of the first grinding face 111 and corners of the second grinding face 112 have phase differences (a), which are different from each other, on the sectional surface perpendicular to the rotational axis R.

As the second angle becomes smaller than the first angle, the first chisel edge 111a and the third chisel edge 112a primarily perform cutting operations. In addition, during the cutting process, chips generated by the first chisel edge 111a and the third chisel edge 112a are exhausted toward adjacent thinning faces. Accordingly, improved performance in exhausting the chips in the chisel portion 110 can be confirmed through experimentation.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

The invention claimed is:

1. A cutting tool comprising:
   a drill body rotating about an imaginary rotational axis; and
   a cutting portion located at a leading edge side of the drill body,
      wherein the cutting portion includes:
      a first grinding face including a first chisel edge radially extending from the rotational axis and a second chisel edge radially extending from the rotational axis and defining a predetermined angle with the first chisel edge;
      a second grinding face including a third chisel edge disposed to be point-symmetrical to the first chisel edge in terms of the rotational axis and a fourth chisel edge disposed to be point-symmetrical to the second chisel edge in terms of the rotational axis;
      a first relief face radially extending from the first chisel edge and the fourth chisel edge and including a first cutting edge formed at a front of a rotation direction of the drill body;
      a second relief face meeting a rear of the rotation direction of the first relief face;
      a third relief face radially extending from the second chisel edge and the third chisel edge, including a second cutting edge positioned at the front of the rotation direction of the drill body and disposed to be point-symmetrical to the first relief face in terms of the rotational axis;
      a fourth relief face meeting the rear of the third relief face in the rotation direction;
      a first intersection line formed along a boundary where the first relief face and the second relief face meet; and
      a second intersection line formed along a boundary where the third relief face and the fourth relief face meet,
      wherein the first intersection line and the second intersection line are spaced apart from an imaginary center line passing the rotational axis, the first relief face and the third relief face.

2. The cutting tool of claim 1, wherein
   the drill body includes a first chip exhaust groove formed along a rotational axis direction between the first relief face and the fourth relief face, and a second chip exhaust groove formed along the rotational axis direction between the third relief face and the second relief face;
   the cutting portion includes a first thinning face extending from the first grinding face to the first chip exhaust groove, and a second thinning face extending from the second grinding face to the second chip exhaust groove;
   the first cutting edge includes a first thinning cutting edge formed between the first thinning face and the first relief face, and a first chip cutting edge formed between the first chip exhaust groove and the first relief face;
   the second cutting edge includes a second thinning cutting edge formed between the second thinning face and the third relief face, and a second chip cutting edge formed between the second chip exhaust groove and the third relief face; and
   a first point angle defined by the first thinning cutting edge and the second thinning cutting edge is smaller than a second point angle defined by the first chip cutting edge and the second chip cutting edge.

3. The cutting tool of claim 2, wherein the first point angle ranges from 90 degrees to 130 degrees.

4. The cutting tool of claim 2, wherein a third point angle defined by the first grinding face and the second grinding face is larger than the first point angle.

5. The cutting tool of claim 4, wherein the third point angle ranges from 120 degrees to 160 degrees.

6. The cutting tool of claim 1, wherein the first chisel edge and the third chisel edge are inclined rearward of the drill body at a first angle with respect to the rotational axis, and the second chisel edge and the fourth chisel edge are inclined rearward of the drill body at a second angle smaller than the first angle with respect to the rotational axis.

7. The cutting tool of claim 1, wherein the first intersection line and the second intersection line are formed to be parallel with the center line.

8. The cutting tool of claim 1, wherein:
the first chisel edge and the third chisel edge are inclined rearward of the drill body at a first angle with respect to the rotational axis, and the second chisel edge and the fourth chisel edge are inclined rearward of the drill body at a second angle smaller than the first angle with respect to the rotational axis; and
the first intersection line and the second intersection line are formed to be parallel with the center line.

9. The cutting tool of claim 2, wherein:
the first chisel edge and the third chisel edge are inclined rearward of the drill body at a first angle with respect to the rotational axis, and the second chisel edge and the fourth chisel edge are inclined rearward of the drill body at a second angle smaller than the first angle with respect to the rotational axis; and
the first intersection line and the second intersection line are formed to be parallel with the center line.

10. The cutting tool according to claim 2, wherein in both a front view and a side view of the cutting tool:
the first thinning cutting edge is connected to the first chisel edge, the first chip cutting edge is connected to the first thinning cutting edge, and the first chip cutting edge forms an obtuse angle with the first thinning cutting edge; and
the second thinning cutting edge is connected to the third chisel edge, the second chip cutting edge is connected to the second thinning cutting edge, and the second chip cutting edge forms an obtuse angle with the second thinning cutting edge.

11. A drill comprising:
a drill body having an imaginary rotational axis; and
a cutting portion located at an end of the drill body, wherein the cutting portion includes:
a first grinding face including a first chisel edge radially extending from the rotational axis and a second chisel edge radially extending from the rotational axis, the first and second chisel edges defining a first acute angle therebetween;
a second grinding face including a third chisel edge disposed to be point-symmetrical to the first chisel edge in terms of the rotational axis and a fourth chisel edge disposed to be point-symmetrical to the second chisel edge in terms of the rotational axis;
a first relief face radially extending from the first chisel edge and the fourth chisel edge, and including a first cutting edge formed at a front of a rotation direction of the drill body;
a second relief face located rotationally rearward of the first relief face and meeting the first relief face at a first intersection line;
a third relief face radially extending from the second chisel edge and the third chisel edge, and including a second cutting edge formed at a front of the rotation direction of the drill body, the third relief face being point-symmetrical to the first relief face in terms of the rotational axis;
a fourth relief face located rotationally rearward of the third relief face and meeting the third relief face at a second intersection line;
wherein the first intersection line and the second intersection line are spaced apart from an imaginary center line passing through the rotational axis, the first relief face and the third relief face.

12. The drill according to claim 11, wherein:
the first chisel edge and the third chisel edge are inclined rearward of the drill body at a first angle with respect to the rotational axis, and the second chisel edge and the fourth chisel edge are inclined rearward of the drill body at a second angle smaller than the first angle with respect to the rotational axis; and
the first intersection line and the second intersection line are formed to be parallel with the center line.

13. The drill according to claim 11, wherein:
the drill body includes a first chip exhaust groove formed along a rotational axis direction between the first relief face and the fourth relief face, and a second chip exhaust groove formed along the rotational axis direction between the third relief face and the second relief face;
the cutting portion includes a first thinning face extending from the first grinding face to the first chip exhaust groove, and a second thinning face extending from the second grinding face to the second chip exhaust groove;
the first cutting edge includes a first thinning cutting edge formed between the first thinning face and the first relief face, and a first chip cutting edge formed between the first chip exhaust groove and the first relief face;
the second cutting edge includes a second thinning cutting edge formed between the second thinning face and the third relief face, and a second chip cutting edge formed between the second chip exhaust groove and the third relief face; and
a first point angle defined by the first thinning cutting edge and the second thinning cutting edge is smaller than a second point angle defined by the first chip cutting edge and the second chip cutting edge.

14. The drill according to claim 13, wherein:
the first chisel edge and the third chisel edge are inclined rearward of the drill body at a first angle with respect to the rotational axis, and the second chisel edge and the fourth chisel edge are inclined rearward of the drill body at a second angle smaller than the first angle with respect to the rotational axis; and
the first intersection line and the second intersection line are formed to be parallel with the center line.

15. The drill according to claim 13, wherein in both a front view a side view of the drill:
the first thinning cutting edge is connected to the first chisel edge, the first chip cutting edge is connected to the first thinning cutting edge, and the first chip cutting edge forms an obtuse angle with the first thinning cutting edge;
the second thinning cutting edge is connected to the third chisel edge, the second chip cutting edge is connected to the second thinning cutting edge, and the second chip cutting edge forms an obtuse angle with the second thinning cutting edge.

16. The drill according to claim 11, wherein:
the first cutting edge comprises a first thinning cutting edge connected to the first chisel edge and a first chip cutting edge connected to the first thinning cutting edge;
the second cutting edge comprises a second thinning cutting edge connected to the third chisel edge and a second chip cutting edge connected to the second thinning cutting edge; and
in both a front view and a side view of the drill:
the first chip cutting edge forms an obtuse angle with the first thinning cutting edge; and the second chip cutting edge forms an obtuse angle with the second thinning cutting edge.

17. The drill according to claim 16, wherein the first chisel edge and the third chisel edge are inclined rearward of the drill body at a first angle with respect to the rotational axis, and the second chisel edge and the fourth chisel edge are inclined rearward of the drill body at a second angle smaller than the first angle with respect to the rotational axis.

18. The drill according to claim 17, wherein the first intersection line and the second intersection line are formed to be parallel with the center line.

19. The drill according to claim 16, wherein the first intersection line and the second intersection line are formed to be parallel with the center line.

\* \* \* \* \*